US004001680B2

United States Statutory Invention Registration [19]

[11] Reg. Number: H1680

Prieto

[45] Published: Sep. 2, 1997

[54] SECONDARY ALKYL SULFATE-CONTAINING HARD SURFACE CLEANING COMPOSITIONS

[75] Inventor: Nelson Eduardo Prieto, Richmond, Tex.

[73] Assignee: Shell Oil Company, Houston, Tex.

[21] Appl. No.: 143,817

[22] Filed: Oct. 27, 1993

[51] Int. Cl.[6] ..... C11D 1/02

[52] U.S. Cl. ..... 510/493; 510/365; 510/422; 510/426; 510/434; 510/488

[58] Field of Search ..... 252/174.19, 174.21, 252/531, 550

[56] References Cited

U.S. PATENT DOCUMENTS

| | | | |
|---|---|---|---|
| 3,838,072 | 9/1974 | Smith et al. | 252/540 |
| 4,028,283 | 6/1977 | Murata | 252/89 |
| 4,052,342 | 10/1977 | Fernley et al. | 252/541 |
| 4,162,994 | 7/1979 | Kowalchuk | 252/532 |
| 4,235,752 | 11/1980 | Rossall et al. | 252/551 |
| 4,474,678 | 10/1984 | Lutz et al. | 252/174 |
| 4,576,738 | 3/1986 | Colodney et al. | 252/559 |
| 4,692,275 | 9/1987 | Secemski et al. | 252/534 |
| 4,758,377 | 7/1988 | Iding | 252/556 |
| 4,828,721 | 5/1989 | Bollier et al. | 252/8.7 |
| 4,869,842 | 9/1989 | Denis et al. | 252/121 |
| 4,880,569 | 11/1989 | Leng et al. | 252/550 |
| 4,923,635 | 5/1990 | Simion et al. | 252/545 |
| 4,923,636 | 5/1990 | Blackburn et al. | 252/550 |
| 4,929,379 | 5/1990 | Oldenburg et al. | 252/109 |
| 4,983,317 | 1/1991 | Requejo et al. | 252/174.24 |
| 5,075,041 | 12/1991 | Lutz | 252/548 |
| 5,082,584 | 1/1992 | Loth et al. | 252/122 |
| 5,096,622 | 3/1992 | Simion et al. | 252/548 |

FOREIGN PATENT DOCUMENTS

| | | |
|---|---|---|
| 884656 | 1/1958 | United Kingdom . |
| 1 560 073 | 10/1976 | United Kingdom . |

*Primary Examiner*—Charles T. Jordan
*Assistant Examiner*—Chrisman D. Carroll

[57] ABSTRACT

The present invention relates to a hard surface cleaning composition comprising from about 0.1 percent by weight to about 50 percent by weight, basis the total weight of the composition, of one or more secondary alkyl sulfate compounds.

19 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SECONDARY ALKYL SULFATE-CONTAINING HARD SURFACE CLEANING COMPOSITIONS

FIELD OF THE INVENTION

The present invention relates to hard surface cleaning compositions containing one or more secondary alkyl sulfate compounds as anionic surfactant components.

BACKGROUND OF THE INVENTION

General purpose household cleaning compositions for hard surfaces such as metal, glass, ceramic, plastic and linoleum surfaces, are commonly available in both powdered and liquid form. Powdered cleaning compositions consist primarily of builder or buffering salts such as phosphates, carbonates, silicates, etc, and are particularly useful for solid and organic soil removal. Liquid cleaning compositions consist primarily of water and/or solvents, and are particularly useful for grease and oily soil removal.

Linear alkylbenzene sulfonate (LAS) is widely used as surfactant in hard surface cleaning compositions. A potential disadvantage of LAS, however, is that under hard water conditions, i.e., calcium levels greater than about 150 parts per million, it can interact with cationic water hardness ions, such as calcium, thereby becoming inactivated through precipitation. While this is a problem common to anionic surfactants, LAS is especially sensitive to water hardness ions.

Although not wishing to be bound by any theory, the literature indicates that the aforementioned interaction can best be understood by considering the micellar structure of anionic surfactants, e.g., LAS. Repulsive forces between negative charges in the sulfonate group lead to a higher critical micelle concentration (CMC) than, for example, with a nonionic surfactant. CMC is the surfactant concentration at which micellar formation begins. Stated otherwise, the negative charge of LAS retards micellar formation and shifts the equilibrium towards the monomer. A relatively high monomer concentration in solution results thereby; this is significant because precipitation between calcium ion and LAS occurs only with the monomer.

It has been found that in both liquid and powdered hard surface cleaning compositions, secondary alkyl sulfate can be used as an anionic surfactant component in place of LAS with the advantages being increased tolerance for water hardness ions, good soil removal properties, higher active raw material, i.e., less water, and better color of anionic raw material.

SUMMARY OF THE INVENTION

The present invention therefore provides a hard surface cleaning composition which comprises from about 0.1 percent by weight to about 50 percent by weight, basis the total weight of the composition, of one or more secondary alkyl sulfate compounds.

The present invention also provides a liquid hard surface cleaning composition comprising from about 0.1 percent by weight to about 21 percent by weight, basis the total weight of the composition, of one or more secondary alkyl sulfate compounds, and from about 60 percent by weight to about 99.9 percent by weight, basis the total weight of the composition, of one or more solvents.

The present invention further provides a powdered hard surface cleaning composition comprising from about 0.1 percent by weight to about 50 percent by weight, basis the total weight of the composition, of one or more secondary alkyl sulfate compounds, and from about 25 percent by weight to about 99.9 percent by weight, basis the total weight of the composition, of one or more builders.

DESCRIPTION OF THE PREFERRED EMBODIMENT

Figure 1:
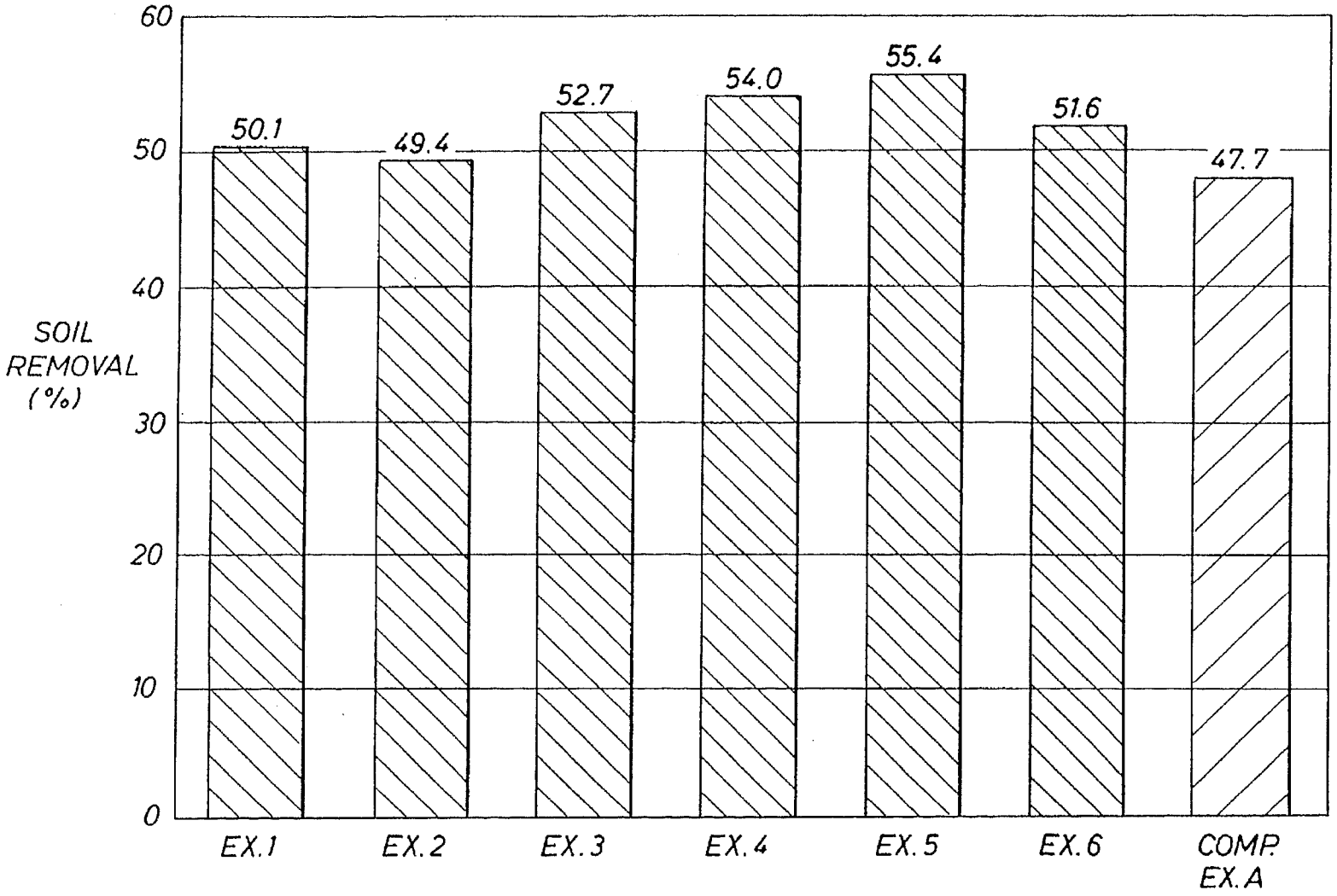
FIG. 1 represents the level of oily/particulate soil which can be removed by both secondary alkyl sulfate-containing hard surface cleaning compositions and non-secondary alkyl sulfate-containing hard surface cleaning compositions from linoleum tiles at room temperature (74° F.) and a water hardness level of 120 parts per million.

The present invention provides a hard surface cleaning composition or formulation which comprises from about 0.1 percent by weight to about 50 percent by weight, preferably from about 1 percent by weight to about 21 percent by weight, basis the total weight of the composition, of one or more secondary alkyl sulfate compounds. Liquid hard surface cleaning compositions also contain from about 60 percent by weight to about 99.9 percent by weight, preferably from about 70 percent by weight to about 98 percent by weight, basis the total weight of the composition, of one or more solvents. Powdered hard surface cleaning compositions contain from about 25 percent by weight to about 99.9 percent by weight, preferably from about 40 percent by weight to about 95 percent by weight, basis the total weight of the composition, of one or more builders.

The secondary alkyl sulfate compounds serve as multifunctional components in the composition. Functioning as anionic surfactant, the presence of these compounds aids in the removal of particulate and oily soils. The secondary alkyl sulfate component further aids in providing a hard surface cleaning composition which is stable and has good foaming properties. In addition, the secondary alkyl sulfate component aids in facilitating suspension of soil, easy addition and/or mixing of actives in the blending process, and hard water tolerance. These several functions of the secondary alkyl sulfate compounds provide a very effective composition in terms of both its cleaning performance and physical properties.

The secondary alkyl sulfate compounds suitable for use in the hard surface cleaning compositions of the present invention have the formula:

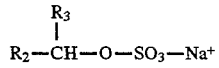

wherein $R_2$ represents an alkyl group having from about 3 to about 18 carbon atoms, and $R_3$ represents an alkyl group having from about 1 to about 6 carbon atoms. In a preferred embodiment, $R_2$ is an alkyl group having from about 10 to about 16 carbon atoms, and $R_3$ is an alkyl group having from about 1 to about 2 carbon atoms. It is preferred that $R_2$ and $R_3$ together are alkyl groups having a total of from about 11 to about 17 carbon atoms. Preferred secondary alkyl sulfate compounds include $C_{12}$ secondary alkyl sulfates (particularly those in which $R_2$ in the above formula represents an alkyl group having 10 carbon atoms and $R_3$ in the above formula represents an alkyl group having 1 carbon atom), $C_{14}$ secondary alkyl sulfates (particularly those in which $R_2$ in the above formula represents an alkyl group having 12 carbon atoms and $R_3$ in the above formula represents an alkyl group having 1 carbon atom) $C_{16}$ secondary alkyl sulfates (particularly those in which $R_2$ in the above formula represents an alkyl group having 14 carbon atoms and $R_3$ in the above formula represents an alkyl group having 1 carbon atom), $C_{18}$ secondary alkyl sulfates (particularly those in which $R_2$ in the above formula represents an alkyl group having 16 carbon atoms and $R_3$ in the above formula represents an alkyl group having 1 carbon atom), and blends of these compounds. The secondary alkyl sulfate component of the heavy duty liquid compositions of the present invention typically comprises a $C_{14}$ secondary alkyl sulfate compound, although blends of one or more $C_{14}$ secondary alkyl sulfate compounds and one or more $C_{18}$ secondary alkyl sulfate compounds, and blends of one or more $C_{14}$ secondary alkyl sulfate compounds, one or more $C_{16}$ secondary alkyl sulfate compounds, and one or more $C_{18}$ secondary alkyl sulfate compounds also provide suitable liquid laundry compositions.

For enhanced biodegradability, it is preferred that the alkyl groups $R_2$ and $R_3$ of the secondary alkyl sulfate molecule all be of predominantly linear carbon chain structure. In this respect, it is particularly preferred that the surfactant molecules be essentially free of alkyl groups having multiple branches in the carbon chain.

The secondary alkyl sulfate compound(s) suitable for use in the present invention is a solid, free-flowing powdered material which has a water content of less than about 3 percent by weight and which is substantially free of diluents. These solid surface active compositions are generally prepared by a crystallization technique. Specifically, the solid secondary alkyl sulfate compositions are prepared by contacting a detergent range alkyl sulfuric acid-containing solution with a base in aqueous solution, removing substantially all of the water from the mixture, cooling in the presence of a nonionic organic liquid diluent to crystallize a solid secondary alkyl sulfate-containing surface active composition from the mixture, and recovering and drying the crystallized secondary alkyl sulfate product. The solid secondary alkyl sulfate product contains at least about 80 percent by weight to about 99 percent by weight of secondary alkyl sulfate. The product generally contains some residual level of sodium sulfate. The product typically contains less than about 12 percent by weight, preferably less than about 9 percent by weight, of sodium sulfate.

The hard surface cleaning composition of the invention comprises from about 0.1 to about 50 percent by weight of the secondary alkyl sulfate component. Compositions containing from about 1 to about 21 percent by weight of the secondary alkyl sulfate component are preferred, while compositions containing from about 2 percent by weight and about 7 percent by weight of the secondary alkyl sulfate component are particularly preferred.

In one embodiment, the hard surface cleaning composition also contains at least one or more additional surfactant or cosurfactant compounds. The additional or cosurfactant compound is selected from the group consisting of nonionic surfactants, anionic surfactants, cationic surfactants, zwitterionic surfactants and mixtures thereof. The additional or cosurfactant compounds function as cleaning agents in the hard surface cleaning composition of the present invention. In a preferred embodiment, it is preferred that the additional surfactant be one or more nonionic surfactants.

The nonionic surfactant or surfactants generally useful as additional or cosurfactant compounds in the present invention are the ethylene oxide condensates (i.e., compounds produced by the condensation of ethylene oxide groups which are hydrophilic in nature with an organic hydrophobic compound which can be aliphatic or alkyl aromatic in nature) and the sugar-derived glycols (i.e., alkylpolyglycosides).

Particularly suitable nonionic surfactants are typically made up of one or more ethylene oxide adducts, i.e. ethoxylates of alcohols or alkyl-substituted phenols, and can be represented by the formula $R—O—(CH_2CH_2O)_n—H$, wherein the RO group corresponds to the starting alcohol or alkyl-substituted phenol (less its active hydrogen atom). In general, the suitable alcohol ethoxylates are derived from alcohols in the carbon range of from about 6 to about 18, while the suitable alkyl phenol ethoxylates are derived from alkyl phenols having alkyl substituents in the carbon range of from about 8 to about 12. Both the alcohol ethoxylates and the alkyl phenol ethoxylates are nonionic surfactants well known as components of conventional hard surface cleaning products.

With regard to the use of alcohol ethoxylate surfactants, the individual compounds are preferably characterized by an alkyl R group in the carbon number range of from about 8 to about 15. Both primary and secondary alcohol ethoxylates (having primary or secondary alkyl R groups, respectively) are suitable in the invention. The R group is suitably linear or branched.

The alkyl-substituted phenol ethoxylate compounds preferably have an alkyl substituent with between about 8 and about 11 carbon atoms. The alkyl substituent may either be branched or linear.

Suitable nonionic ethoxylate surfactants typically contain an average number of ethylene oxide units (i.e., an average value of n in the above formula) which is in the range of from about 3 to about 14 per molecule. Preferably, the ethoxylate surfactants contain an average number of ethylene oxide units which is in the range of from about 5 to about 9 per molecule.

The sugar-derived glycols or alkyl glycosides which are useful as nonionic surfactants preferably have from about 6 to about 30 carbon atoms. Particularly suitable sugar-derived glycols are the alkylpolyglycosides.

Suitable anionic surfactants for use as additional surfactant or cosurfactant compounds in the hard surface cleaning compositions of the present invention include the water-soluble, particularly the alkali metal, ammonium and alkylammonium (e.g., monoethanolammonium, diethanolammonium or triethanolammonium) salts of organic sulfuric acid reaction products having in their molecular structure an alkyl group containing from about 10 to about 20 carbon atoms and a sulfonic or sulfuric acid ester group. As used herein, the term "alkyl" also includes the alkyl portion of aryl groups. Examples of anionic synthetic surfactants include primary alkyl sulfates, especially those obtained by sulfating the higher alcohols ($C_8$ to $C_{18}$ carbon atoms), and alkylbenzene sulfonates in which the alkyl group contains from about 9 to about 15 carbon atoms in a straight chain or branched chain configuration.

Other suitable anionic surfactants which can be used in addition to secondary alkyl sulfate in the liquid detergent composition include the water-soluble salts of: paraffin sulfonates containing from about 8 to about 24 carbon atoms; olefin sulfonates containing from about 8 to about 24, preferably from about 12 to about 16 carbon atoms, particularly alpha olefin sulfonates; alkenyl or alkyl carboxysulfonates containing from about 8 to about 30 carbon atoms; alkyl ethoxycarboxylates containing from about 8 to about 24 carbon atoms and having from about 1 to about 10 units of ethylene oxide per molecule; alkyl glyceryl ether sulfonates derived from ethers of $C_8$ –$C_{18}$ alcohols; alkyl phenol ethoxysulfates containing from about 1 to about 10 units of ethylene oxide per molecule and from about 8 to about 12 carbon atoms in the alkyl group; ethoxysulfates, i.e., alkyl ethylene oxide ether sulfates, containing from about 1 to about 10 units of ethylene oxide per molecule and from about 10 to about 15 carbon atoms in the alkyl group; and soap. Especially suitable are water-soluble salts of alcohol ethoxysulfates containing from about 1 to about 6 units of ethylene oxide per molecule and from about 8 to about 18 carbon atoms in the alkyl group.

Other useful anionic surfactants include the water-soluble salts of esters of alpha-sulfonated fatty acids containing from about 6 to about 20 carbon atoms in the fatty acid group and from about 1 to about 10 carbon atoms in the ester group; water-soluble salts of 2-acyloxy-alkane-1-sulfonic acids containing from about 2 to about 9 carbon atoms in the acyl group and from about 9 to about 23 carbon atoms in the alkane moiety; and beta-alkoxy alkane sulfonates containing from about 1 to about 3 carbon atoms in the alkyl group and from about 8 to about 20 carbon atoms in the alkane moiety.

Preferred anionic surfactants for use as additional or cosurfactant compounds are the alcohol ethoxysulfates which contain an average of up to about 6 ethylene oxide units per mole of alkyl sulfate.

Suitable zwitterionic surfactants for use as additional surfactant or cosurfactant compounds in the present composition include derivatives of aliphatic quaternary ammonium, phosphonium, and sulfonium compounds in which the aliphatic moiety can be straight chain or branched chain and wherein one of the aliphatic substituents contains at least one anionic water-solubilizing group. Examples of suitable zwitterionic surfactants include 3-(N,N-dimethyl-N-hexadecylammonio)-propane-1-sulfonate and the ammonium sulfonates and sulfates disclosed in U.S. Pat. Nos. 3,925,262, issued Dec. 9, 1975 and 3,929,678, issued Dec. 30, 1975, the teachings of which are incorporated herein by reference.

Suitable cationic surfactants for use as additional or cosurfactant compounds in the present hard surface cleaning composition include octadecyl trimethylammonium chloride, cetyl trimethylammonium methyl sulfate, polymeric cationics derived from monomers such as N,N,N-trimethyl-N-methylacryloxy (2-hydroxypropyl) ammonium chloride and cationic monomers such as those described in U.S. Pat. Nos. 4,212,820, issued on Jul. 15, 1980, 4,098,987, issued on Jul. 4, 1978, 4,171,418, issued on Oct. 16, 1979, and 4,426,489, issued Jan. 7, 1984, the relevant teachings of which are incorporated herein by reference. In addition to quaternary ammonium cationic moieties, the compounds with phosphonium, sulfonium, pyridium and isothiouronium moieties and the like are also among the well known cationic surfactants.

The additional surfactant or cosurfactant compound(s) is typically utilized in the hard surface cleaning composition in an amount of from about 0 percent by weight to about 15 percent by weight, and preferably in the range of from about 0.1 percent by weight to about 12 percent by weight, and more preferably from about 0.2 percent by weight to about 6 percent by weight, basis the total weight of the hard surface cleaning composition.

The hard surface cleaning compositions of the present invention can, if desired, contain one or more builder components. Powdered hard surface cleaning compositions necessarily contain one or more builders, while liquid hard surface cleaning compositions often contain no builder or relatively small amounts of one or more builders. Builders are known to be added to powdered hard surface cleaning compositions to enhance cleaning performance by softening water, providing alkalinity and buffering capacity, providing emulsification and deflocculation properties, and providing abrasive action. This builder component can either be of the organic or inorganic type. The builder component is preferably one or more materials selected from the group consisting of hydratable alkali metal phosphates, alkali metal carbonates and bicarbonates (mixed or separate, anhydrous or partially hydrated), zeolites (either crystalline or amorphous, and either natural or synthetic), ethylenediamine tetraacetate, nitrilotriacetate, and mixtures thereof. Carbonates and complexing agents such as, for example, ethylenediaminetetraacetate, are particularly preferred builders. Examples of water-soluble inorganic builders which can be used, alone or in admixture with themselves and organic alkaline builder salts, are alkali metal carbonates, phosphates, polyphosphates, and silicates. Specific examples of such salts are sodium tripolyphosphate, sodium carbonate, potassium carbonate, trisodium phosphate, tetrasodium pyrophosphate, tetrapotassium pyrophosphate, potassium tripolyphosphate, and sodium hexametaphosphate. Examples of organic builder salts which can be used alone, or in admixture with each other or with the preceding inorganic alkaline builder salts are alkali metal polycarboxylates, e.g., water-soluble citrates such as sodium and potassium citrate, sodium and potassium tartrate, the sodium and potassium salts of tartaric acid monosuccinate, the sodium and potassium salts of tartaric acid disuccinate, sodium and potassium ethylenediaminetetraacetate, sodium and potassium N-(2-hydroxyethyl)-ethylene diamine triacetates, sodium and potassium nitrilo triacetates and sodium and potassium N-(2-hydroxyethyl)-nitrilo diacetates. Other organic detergency builders such as water-soluble phosphonates can find use in the compositions of the invention. In powdered hard surface cleaning compositions, the builder is generally present in an amount between about 25 percent by weight and about 99.9 percent by weight, preferably in an amount between about 40 percent by weight and about 95 percent by weight, and most preferably between about 65 percent by weight and about 95 percent by weight, basis the total weight of the hard surface cleaning composition. In liquid hard surface cleaning compositions, the builder is typically present in an amount between about 0 percent by weight and about 32 percent by weight, preferably between about 0.1 percent by weight and about 12 percent by weight, and more preferably between about 0.5 percent by weight and about 4 percent by weight, basis the total weight of the hard surface cleaning composition.

The hard surface cleaning composition may also contain an alkanolamine component selected from the group consisting of an monoethanolamine, diethanolamine, triethanolamine and mixtures thereof. Low levels of the alkanolamines, particularly monoethanolamine, are used to enhance product cleaning performance and buffering ability. While the present compositions can contain mixtures of the alkanolamines, best color stability is obtained using single alkanolamines. When the hard surface cleaning composition contains an alkanolamine component, such component is typically present in the composition in an amount in the range of from about 0 percent by weight to about 7 percent by weight, and preferably in an amount in the range of from about 1 percent by weight to about 4 percent by weight, basis the total weight of the hard surface cleaning composition.

The hard surface cleaning composition of the present invention may also contain one or more solvents to aid in the soil removal and blending of the surfactants and builder components, if present. Liquid hard surface cleaning compositions necessarily contain one or more solvents, while powdered hard surface cleaning compositions often contain no solvent or relatively small amounts of one or more solvents. Solvents are known to be added to liquid hard surface cleaning compositions to stabilize, couple ingredients, and enhance performance. The solvent may be water or any other known solvent which aids in the blending of surfactants. Solvents other than water which are suitable include the lower alcohols such as, for example, ethanol, isopropanol, butanol, etc., the alkali metal aryl sulfonates such as, for example, sodium xylenesulfonate, sodium cumenesulfonate, sodium toluenesulfonate, etc., the polyols such as, for example, propylene glycol, hexylene glycol, etc., the glycol ethers such as, for example, propylene glycol n-butylether and monopropylene glycol monomethylether, etc., ethylene glycol monobutylether, diethylene glycol monobutylether, and the like and mixtures thereof. The solvent(s) is typically present in a liquid hard surface cleaning composition in an amount in the range of from about 60 percent by weight to about 99.9 percent by weight, basis the total weight of the composition.

When a lower alcohol is used as a solvent, it is typically used in combination with at least one other solvent such as water, polyols, etc. The amount of lower alcohol utilized in the hard surface cleaning composition is generally an amount in the range of from about 0.1 percent by weight to about 7 percent by weight, basis the total weight of the composition.

Any polyol containing from about 2 to about 6 carbon atoms and from 2 to about 6 hydroxy groups can be used as a solvent in the liquid hard surface cleaning compositions of the present invention. Examples of such polyols are ethylene glycol, propylene glycol, hexylene glycol and glycerine. Propylene glycol is particularly preferred. When a polyol is used as a solvent, the polyol typically is used in combination with at least one other solvent and represents from about 0.1 percent by weight to about 11 percent by weight, basis the total weight of the detergent composition.

In a preferred embodiment, the solvent is water or a water-containing solvent system. The hard surface cleaning compositions generally contain from about 0.1 percent by weight to about 99.9 percent by weight, preferably from about 7 percent by weight to about 98 percent by weight, basis the total weight of the composition, of water. A particularly suitable water-containing solvent system contains water, ethanol and one or more polyols. In liquid hard surface cleaning compositions, the solvent is generally present in an amount between about 60 percent by weight and about 99.9 percent by weight, preferably in an amount between about 70 percent by weight and about 98 percent by weight, and most preferably between about 85 percent by weight and about 98 percent by weight, basis the total weight of the hard surface cleaning composition. In powdered hard surface cleaning compositions, the solvent is typically present in an amount between about 0.1 percent by weight and about 21 percent by weight, and preferably between about 0.5 percent by weight and about 4 percent by weight, basis the total weight of the hard surface cleaning composition.

In addition to its anionic surfactant component, secondary alkyl sulfate, the hard surface cleaning composition may suitably contain of other components known in the art for use in hard surface cleaners. Non-limiting examples of such components include filler compounds such as sodium sulfate and sodium chloride, dyes, fragrances, bleaches, bleach activators, enzymes, viscosity modifiers, and the like. The amount of these components present in the hard surface cleaning composition will typically be less than about 10 percent by weight, and preferably less than about 5 percent by weight, basis the total weight of the composition. It is understood, however, filler compounds may comprise up to about 50 percent by weight of the total composition in powdered hard surface cleaning compositions.

The various components of the hard surface cleaning composition are suitably blended into the finished composition by conventional methods such as, for instance, by direct mixing/blending and/or agglomeration for liquid compositions and dry mixing/blending for powdered compositions. In a preferred embodiment, a liquid hard surface cleaning composition contains from about 2 percent by weight to about 7 percent by weight, basis the total weight of the composition, of a secondary alkyl sulfate compound having a carbon number in the range of from about 12 to about 18, from about 0.1 percent by weight to about 12 percent by weight, basis the total weight of the composition, of at least one additional surfactant, from about 0.1 percent by weight to about 12 percent by weight, basis the total weight of the composition, of a builder, and from about 70 percent by weight to about 98 percent by weight, basis the total weight of the composition, of a solvent.

The soiled surfaces to be cleaned by the hard surface cleaning compositions of the present invention include surfaces containing oily or greasy materials and other soils, as well as dust and dirt, etc.

The ranges and limitations provided in the instant specification and claims are those which are believed to particularly point out and distinctly claim the present invention. It is, however, understood that other ranges and limitations which perform substantially the same function in substantially the same manner to obtain the same or substantially the same result are intended to be within the scope of the present invention as defined by the specification and claims.

The invention is further described with reference to the following examples, which are intended to illustrate certain aspects of the invention, without limiting its broader scope.

ILLUSTRATIVE EMBODIMENTS

Example 1

79.4 Grams of water were added to the mixing vessel and warmed to 100° F. 2.5 Grams of sodium xylenesulfonate (40% active), 6 grams of sodium ethylenediaminetetraacetate, 4 grams of sodium carbonate, 3.3 Grams of $C_{12}$ secondary alkyl sulfate (SAS) (sodium salt, 99% active powder) and 4.8 grams of $C_{12}$–$C_{13}$ alcohol ethoxylate having an average of 6.5 ethylene oxide units per molecule (AE) were sequentially added to the water and the mixture was allowed to stir. The resulting material was a clear stable liquid. The properties of the composition prepared are presented in Table I and FIG. 1.

Example 2

73.9 Grams of water were added to the mixing vessel and warmed to 100° F. 8 Grams of sodium xylenesulfonate (40% active), 6 grams of sodium ethylenediaminetetraacetate, 4 grams of sodium carbonate, 3.3 grams of $C_{14}$ secondary alkyl sulfate (SAS) (sodium salt, 99% active powder) and 4.8 grams of $C_{12}$–$C_{13}$ alcohol ethoxylate having an average of 6.5 ethylene oxide units per molecule, were sequentially added to the water and the mixture was allowed to stir. The resulting material was a slightly hazy liquid. The properties of the composition prepared are presented in Table I and FIG. 1.

Example 3

76.8 Grams of water were added to the mixing vessel and warmed to 100° F. 5.1 Grams of sodium xylenesulfonate (40% active), 6 grams of sodium ethylenediaminetetraacetate, 4 grams of sodium carbonate, 1.66 grams of $C_{14}$ secondary alkyl sulfate (SAS) (sodium salt,. 99% active powder), 1.66 grams of $C_{16}$ secondary alkyl sulfate (SAS) (sodium salt, 99% active powder) and 4.8 grams of $C_{12}$–$C_{13}$ alcohol ethoxylate having an average of 6.5 ethylene oxide units per molecule, were sequentially added to the water and the mixture was allowed to stir. The resulting material was a clear stable liquid. The properties of the composition prepared are presented in Table I and FIG. 1.

Example 4

73.9 Grams of water were added to the mixing vessel and warmed to 100° F. 8 Grams of sodium xylenesulfonate (40% active), 6 grams of sodium ethylenediaminetetraacetate, 4 grams of sodium carbonate, 3.3 grams of $C_{16}$ secondary alkyl sulfate (SAS) (sodium salt, 99% active powder) and 4.8 grams of $C_{12}$–$C_{13}$ alcohol ethoxylate having an average of 6.5 ethylene oxide units per molecule, were sequentially added to the water and the mixture was allowed to stir. The resulting material was a cloudy liquid. The properties of the composition prepared are presented in Table I and FIG. 1.

Example 5

73.9 Grams of water were added to the mixing vessel and warmed to 100° F. 8 Grams of sodium xylenesulfonate (40% active), 6 grams of sodium ethylenediaminetetraacetate, 4 grams of sodium carbonate, 3.3 grams of $C_{18}$ secondary alkyl sulfate (SAS) (sodium salt, 99% active powder) and 4.8 grams of $C_{12}$–$C_{13}$ alcohol ethoxylate having an average of 6.5 ethylene oxide units per molecule, were sequentially added to the water and the mixture was allowed to stir. The resulting material was a cloudy unstable liquid. The properties of the composition prepared are presented in Table I and FIG. 1.

Example 6

73.9 Grams of water were added to the mixing vessel and warmed to 100° F. 8 Grams of sodium xylenesulfonate (40% active), 6 grams of sodium ethylenediaminetetraacetate, 4 grams of sodium carbonate, 0.67 grams of $C_{12}$ secondary alkyl sulfate (SAS) (sodium salt, 99% active powder), 2.67 grams of $C_{16}$ secondary alkyl sulfate (SAS) (sodium salt, 99% active powder), and 4.8 grams of $C_{12}$–$C_{13}$ alcohol ethoxylate having an average of 6.5 ethylene oxide units per molecule, were sequentially added to the water and the mixture was allowed to stir. The resulting material was a clear stable liquid. The properties of the composition prepared are presented in Table I and FIG. 1.

COMPARATIVE EXAMPLE A

Comparative Example A was carried out in a manner similar to Example 1, except that 65.8 grams of water and 6.2 grams of sodium xylenesulfonate (40% active) were used, and 13.2 grams of $C_{12}$ linear alkylbenzene sulfonate (LAS) (sodium salt, 25% active) were used in place of the secondary alkyl sulfate component. The resulting material was a clear stable liquid. The properties of the composition prepared are presented in Table I and FIG. 1.

DISCUSSION OF THE RESULTS AND DETAILED DESCRIPTION OF THE DRAWING

As can be seen in Table I and FIG. 1, the level of soil removal obtained with secondary alkyl sulfate-containing hard surface cleaning compositions (Examples 1–6) is much higher than that obtained with hard surface cleaning compositions containing LAS (Comparative Example A). It can also be seen from Table I that some of the cleaning compositions containing secondary alkyl sulfate (Examples 1 and 3) required a smaller amount of coupling agent, i.e., sodium xylenesulfonate, to obtain a clear stable liquid composition.

TABLE I

SECONDARY ALKYL SULFATES (SAS) IN HARD SURFACE CLEANERS (HSC's)

| Component, % wt | Ex. 1 | Ex. 2 | Ex. 3 | Ex. 4 | Ex. 5 | Ex. 6 | Comp. Ex. A |
|---|---|---|---|---|---|---|---|
| Basis 100% active unless otherwise indicated | | | | | | | |
| $C_{12}$SAS | 3.3 | None | None | None | None | 0.66 | None |
| $C_{14}$SAS | None | 3.3 | 1.65 | None | None | None | None |
| $C_{16}$SAS | None | None | 1.65 | 3.3 | None | 2.64 | None |
| $C_{18}$SAS | None | None | None | None | 3.3 | None | None |
| $C_{12}$LAS | None | None | None | None | None | None | 3.3 |
| $C_{12-13}EO_{6.5}$ | 4.8 | 4.8 | 4.8 | 4.8 | 4.8 | 4.8 | 4.8 |
| Sodium Carbonate | 4.0 | 4.0 | 4.0 | 4.0 | 4.0 | 4.0 | 4.0 |
| $Na_4$ EDTA | 6.0 | 6.0 | 6.0 | 6.0 | 6.0 | 6.0 | 6.0 |
| Sodium Xylenesulfonate (40%) | 2.5 | 8.0 | 5.1 | 8.0 | 8.0 | 8.0 | 6.2 |
| Water | 79.4 | 73.9 | 76.8 | 73.9 | 73.9 | 73.9 | 75.7 |
| Appearance[a], 24° C. | + | + | + | − | − | + | + |
| Clear Point[b], °C. | <−5 | ND | 1 | ND | ND | 33 | <−5 |
| PCT[c], °C. | >80 | ND | 75 | ND | ND | <50 | 60 |
| Detergency[d] | 50.1 | 49.4 | 52.7 | 54.0 | 55.4 | 51.6 | 47.7 |

[a]+ = clear, homogeneous solution; − = cloudy, not homogeneous; and ND = not determined.
[b]Clear point is the temperature above which the formulation is reliably clear.

TABLE I-continued

SECONDARY ALKYL SULFATES (SAS) IN HARD SURFACE CLEANERS (HSC's)

| Component, % wt | Ex. 1 | Ex. 2 | Ex. 3 | Ex. 4 | Ex. 5 | Ex. 6 | Comp. Ex. A |
|---|---|---|---|---|---|---|---|

[c]Phase coalescence temperature (PCT) is the highest temperature at which the formulation can be heated with out it separating into two phases.
[d]Temperature = 74° F., 120 ppm water hardness. Soil removal from linoleum tiles was determined as described in section A3 of ASTM D 4488–89 standard test method. "Annual Book of ASTM Standards", vol. 15.04, American Society for Testing and Materials, Philadelphia, Pennsylvania. All examples and comparative examples were tested at a dose of 2 grams/liter (2% wt.). Results are expressed as percent soil removal.

What is claimed is:

1. A hard surface cleaning composition comprising from about 0.1 percent by weight to about 50 percent by weight, basis the total weight of the composition, of one or more secondary alkyl sulfate compounds.

2. A liquid hard surface cleaning composition comprising from about 0.1 percent by weight to about 21 percent by weight, basis the total weight of the composition, of one or more secondary alkyl sulfate compounds, and from about 60 percent by weight to about 99.9 percent by weight, basis the total weight of the composition, of one or more solvents.

3. A powdered hard surface cleaning composition comprising from about 0.1 percent by weight to about 50 percent by weight, basis the total weight of the composition, of one or more secondary alkyl sulfate compounds, and from about 25 percent by weight to about 99.9 percent by weight, basis the total weight of the composition, of one or more builders.

4. The composition of claim 1 wherein said one or more secondary alkyl sulfate compounds has a formula:

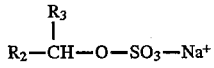

wherein $R_2$ represents an alkyl group having from about 3 to about 18 carbon atoms and $R_3$ represents an alkyl group having from about 1 to about 6 carbon atoms.

5. The composition of claim 4 wherein said one or more secondary alkyl sulfate compounds is selected from the group consisting of a $C_{12}$ secondary alkyl sulfate wherein $R_2$ represents an alkyl group having 10 carbon atoms and $R_3$ represents an alkyl group having 1 carbon atom, a $C_{14}$ secondary alkyl sulfate wherein $R_2$ represents an alkyl group having 12 carbon atoms and $R_3$ represents an alkyl group having 1 carbon atom, a $C_{16}$ secondary alkyl sulfate wherein $R_2$ represents an alkyl group having 14 carbon atoms and $R_3$ represents an alkyl group having 1 carbon atom, a $C_{18}$ secondary alkyl sulfate wherein $R_2$ represents an alkyl group having 16 carbon atoms and $R_3$ represents an alkyl group having 1 carbon atom, and mixtures of these compounds.

6. The composition of claim 1 wherein the secondary alkyl sulfate compound is added to the composition in the form of a free flowing powder.

7. The composition of claim 1 wherein the secondary alkyl sulfate compound is present in the composition in an amount of from about 1 percent by weight to about 21 percent by weight, basis the total weight of the composition.

8. The composition of claim 3 wherein said one or more builders is selected from the group consisting of alkali metal carbonates, alkali metal phosphates, alkali metal polyphosphates, alkali metal silicates, alkali metal bicarbonates, alkali metal polycarboxylates, polyacrylates and mixtures thereof.

9. The composition of claim 8 wherein said one or more builders is an alkali metal polycarboxylate.

10. The composition of claim 9 wherein said alkali metal polycarboxylate is selected from the group consisting of sodium citrate, potassium citrate, the sodium salt of tartaric acid monosuccinate, the potassium salt of tartaric acid monosuccinate, the sodium salt of tartaric acid disuccinate, the potassium salt of tartaric acid disuccinate, and mixtures thereof.

11. The composition of claim 3 wherein said builder is present in an amount of from about 40 percent by weight to about 95 percent by weight, basis the total weight of the composition.

12. The composition of claim 1 wherein said composition additionally comprises one or more cosurfactant compounds selected from the group consisting of anionic surfactants, nonionic surfactants, cationic surfactants, zwitterionic surfactants, and mixtures thereof.

13. The composition of claim 1 wherein said composition additionally comprises one or more cosurfactant compounds selected from the group consisting of anionic surfactants, nonionic surfactants, and mixtures thereof.

14. The composition of claim 13 wherein said one or more cosurfactant compounds is a nonionic surfactant selected from alcohol ethoxylates having an average of from about 3 to about 14 ethylene oxide units per ethoxylate molecule, alkyl-substituted phenol ethoxylates having an average of from about 3 to about 14 ethylene oxide units per ethoxylate molecule, sugar-derived glycols, and mixtures thereof.

15. The composition of claim 1 wherein said composition additionally comprises from about 0.1 percent by weight to about 12 percent by weight, basis the total weight of the composition, of one or more cosurfactant compounds.

16. The composition of claim 2 wherein said one or more solvents is selected from the group consisting of water, lower alcohols, polyols, alkali metal aryl sulfonates and mixtures thereof.

17. The composition of claim 16 wherein said one or more solvents comprises a mixture of a lower alcohol, water, and a polyol.

18. The composition of claim 2 wherein said composition comprises from about 70 percent by weight to about 98 percent by weight, basis the total weight of the composition, of one or more solvents.

19. The composition of claim 1 wherein said composition comprises from about 0.1 percent by weight to about 99.9 percent by weight, basis the total weight of the composition, of one or more solvents.

* * * * *